(12) United States Patent
Neubarth et al.

(10) Patent No.: US 11,315,074 B2
(45) Date of Patent: Apr. 26, 2022

(54) SMART SHELF SYSTEM

(71) Applicant: AiFi Corp, Santa Clara, CA (US)

(72) Inventors: Stuart Neubarth, Mountain View, CA (US); Steve Gu, Santa Clara, CA (US); Ying Zheng, Santa Clara, CA (US)

(73) Assignee: AiFi Corp, Santa Clara, CA (US)

( * ) Notice: Subject to any disclaimer, the term of this patent is extended or adjusted under 35 U.S.C. 154(b) by 438 days.

(21) Appl. No.: 16/594,021

(22) Filed: Oct. 6, 2019

(65) Prior Publication Data

US 2021/0103881 A1    Apr. 8, 2021

(51) Int. Cl.
*G06Q 10/08* (2012.01)
*G06Q 90/00* (2006.01)
*G06Q 30/06* (2012.01)
*G01G 19/414* (2006.01)
*G06V 20/00* (2022.01)

(52) U.S. Cl.
CPC .......... *G06Q 10/087* (2013.01); *G01G 19/414* (2013.01); *G06Q 30/0639* (2013.01); *G06Q 90/20* (2013.01); *G06V 20/00* (2022.01)

(58) Field of Classification Search
CPC ...... G01G 19/42; G01G 19/414; G06Q 90/20; G06Q 30/0639; G06Q 10/087; G06Q 10/08; G06Q 30/06; G06Q 90/00; G06V 20/00; G06V 20/52; G06K 9/00
USPC ............................................................ 705/28
See application file for complete search history.

(56) References Cited

U.S. PATENT DOCUMENTS

| | | | |
|---|---|---|---|
| 9,911,290 B1* | 3/2018 | Zalewski | G06Q 30/0633 |
| 10,237,058 B2* | 3/2019 | Aihara | H04L 9/0816 |
| 11,010,419 B2* | 5/2021 | Greenberger | G06F 16/438 |
| 11,188,973 B2* | 11/2021 | Bynum | G06Q 30/0639 |
| 2016/0048798 A1* | 2/2016 | Meyer | G01G 19/42 |
| | | | 705/28 |
| 2016/0132822 A1* | 5/2016 | Swafford | H04W 4/80 |
| | | | 705/28 |
| 2018/0096566 A1* | 4/2018 | Blair, II | G07G 1/0054 |
| 2020/0184442 A1* | 6/2020 | Gu | G07G 1/0054 |
| 2020/0279240 A1* | 9/2020 | Glaser | G06Q 20/203 |

\* cited by examiner

*Primary Examiner* — Andrew Joseph Rudy

(57) ABSTRACT

The present invention describes a shelf system for monitoring items coupled with support utilities. The system is configured to detect item change caused by customer actions and optimize the camera system and computing resources of a remote server. The system also is configured to sense certain visual indicators with customer actions.

9 Claims, 3 Drawing Sheets

SMART SHELF SYSTEM

BACKGROUND OF THE INVENTION

This application relates to systems, methods, devices, and other techniques for a smart shelf of monitoring items coupled with support utilities. The system is configured to detect items addition, removal or change caused by customer actions and optimizes computing resources of a remote server. The system is also configured to sense items that are removed, added or misplaced automatically. The system also can coordinate the shelf, camera systems and LED lights to optimize shopping experience. The system also can utilize mirrors to widen the field of view of camera system.

Retail stores frequently display products on shelves for easy accessibility by customers. A shelf may be attached to a wall, a shelf, a stand, or any other surface. Typically, one or more products or items are placed on a shelf. A shelf sometimes includes a label or other signage indicating the name or type of items placed on a shelf. Customers can frequently remove, add or change items on a shelf.

Therefore, it is desirable to have a shelf system that is configured to detect actions caused by customer actions and optimize the camera system and computing resources of a remote server. Also it is beneficial to have the system sense items that are removed, added or misplaced automatically. Also it is beneficial to have LED lights blinking to guide customers based on their previous choices and some predetermined patterns.

SUMMARY OF THE INVENTION

This application relates to systems, methods, devices, and other techniques for a smart shelf of monitoring items coupled with support utilities. The system is configured to detect items addition, removal or change caused by customer actions and optimizes computing resources of a remote server. The system is also configured to sense items that are removed, added or misplaced automatically. The system also can coordinate the shelf, camera systems and LED lights to optimize shopping experience. The system also can utilize mirrors to widen and deepen the field of view of camera system.

In some embodiments, the invention is related to a shelf system that can improve shopping experiences, comprising: at least one smart shelf, wherein a set of load sensors are placed on each corner of the at least one smart shelf, wherein the set of load sensors are configured to measure load data placed at the each corner of the at least one smart shelf; a data processing device coupled to the set of load sensors, wherein the data processing device is configured to calculate weight and change in weight by combining the load data from the each corner of the at least one smart shelf, wherein the data processing device is configured to determine location of an item removed or placed by calculating the location based on changes of load data at the each corner of the at least one smart shelf; a set of cameras coupled to the shelf system, wherein the set of cameras is configured to capture video information of the item on the at least one smart shelf; a set of indicators coupled to the shelf system, wherein each of the set of indicators is placed under each item coupled to the shelf system, wherein the each of the set of indicators is configured to blink when the each item above the each of the set of indicators is removed; and a remote server coupled to the data processing device and the set of cameras via a network, wherein the remote server is configured to use computational resources to process the video information from the set of cameras, wherein the remote server is configured to receive information of the location of the item removed or placed from the data processing device, wherein the remote server is configured to prioritize computational resources to any cameras of the set of cameras with a view of the location of the item removed or placed from the data processing device. In some embodiments, the shelf system has the network that is connected by Ethernet.

In some embodiments, the set of load sensors, the set of cameras and the set of cameras are using power over Ethernet.

In some embodiments, the invention may describe a shelf system, comprising: at least one smart shelf, wherein a set of load sensors are placed on each corner of the at least one smart shelf, wherein the set of load sensors are configured to measure load data placed at the each corner of the at least one smart shelf; a data processing device coupled to the set of load sensors, wherein the data processing device is configured to calculate weight and change in weight by combining the load data from the each corner of the at least one smart shelf, wherein the data processing device is configured to determine location of an item removed or placed by calculating the location based on changes of load data at the each corner of the at least one smart shelf; a set of cameras coupled to the shelf system, wherein the set of cameras is configured to capture video information of the item on the at least one smart shelf; a remote server coupled to the data processing device and the set of cameras via a network, wherein the remote server is configured to use computational resources to process the video information from the set of cameras, wherein the remote server is configured to receive information of the location of the item removed or placed from the data processing device, wherein the remote server is configured to prioritize computational resources to any cameras of the set of cameras with a view of the location of the item removed or placed from the data processing device; a set of visual indicators coupled to the at least one smart shelf, wherein the set of visual indicators are coupled to blink to identify the geo-location of the at least one smart shelf, wherein the set of visual indicators are configured to blink pre-determined patterns to convey digital data to the remote server via the set of cameras, wherein one type of the digital data is unique ID of the at least one smart shelf, wherein the unique ID is related to the physical location of the at least one smart shelf, wherein the set of visual indicators are configured to direct a shopper to a specific item the shopper has purchased before, or an item on the shopper's request, or an item that has a special discount.

In some embodiments, the shelf system has the network that is connected by Ethernet.

In some embodiments, the set of load sensors, the set of cameras and the set of cameras are using power over Ethernet.

In some embodiments, the invention may describe a shelf system, comprising: at least one smart shelf, wherein a set of load sensors are placed on each corner of the at least one smart shelf, wherein the set of load sensors are configured to measure load data placed at the each corner of the at least one smart shelf; a data processing device coupled to the set of load sensors, wherein the data processing device is configured to calculate weight and change in weight by combining the load data from the each corner of the at least one smart shelf, wherein the data processing device is configured to determine location of an item removed or placed by calculating the location based on changes of load data at the each corner of the at least one smart shelf; a set of cameras coupled to the shelf system, wherein the set of cameras is configured to capture video information of the item on the at least one smart shelf, whereas another shelf contains a mirror on the another shelf's bottom, where the at least one smart shelf has a camera of the set of cameras pointing up at the mirror of the another shelf, with a field of view of any items on the at least one smart shelf; a remote server coupled to the data processing device and the set of cameras via a network, wherein the remote server is configured to use computational resources to process the video information from the set of cameras, wherein the remote server is configured to receive information of the location of the item removed or placed from the data processing device, wherein the remote server is configured to prioritize computational resources to any cameras of the set of cameras with a view of the location of the item removed or placed from the data processing device, wherein a video image processing algorithm is used to identify the products removed, added or misplaced, wherein changes in weight are used to increase the confidence of identification of the products removed, added or misplaced. a set of visual indicators coupled to the at least one smart shelf, wherein the set of visual indicators are coupled to blink to identify the geo-location of the at least one smart shelf, wherein the set of visual indicators are configured to blink pre-determined patterns to convey digital data to the remote server via the set of cameras, wherein one type of the digital data is unique ID of the at least one smart shelf, wherein the unique ID is related to the physical location of the at least one smart shelf, wherein the set of visual indicators are configured to direct a shopper to a specific item the shopper has purchased before, or an item on the shopper's request, or an item that has a special discount.

In some embodiments, the shelf system has the network that is connected by Ethernet.

In some embodiments, the set of load sensors, the set of cameras and the set of cameras are using power over Ethernet.

These and other aspects, their implementations and other features are described in details in the drawings, the description and the claims.

DETAILED DESCRIPTION OF THE INVENTION

Figure 1:
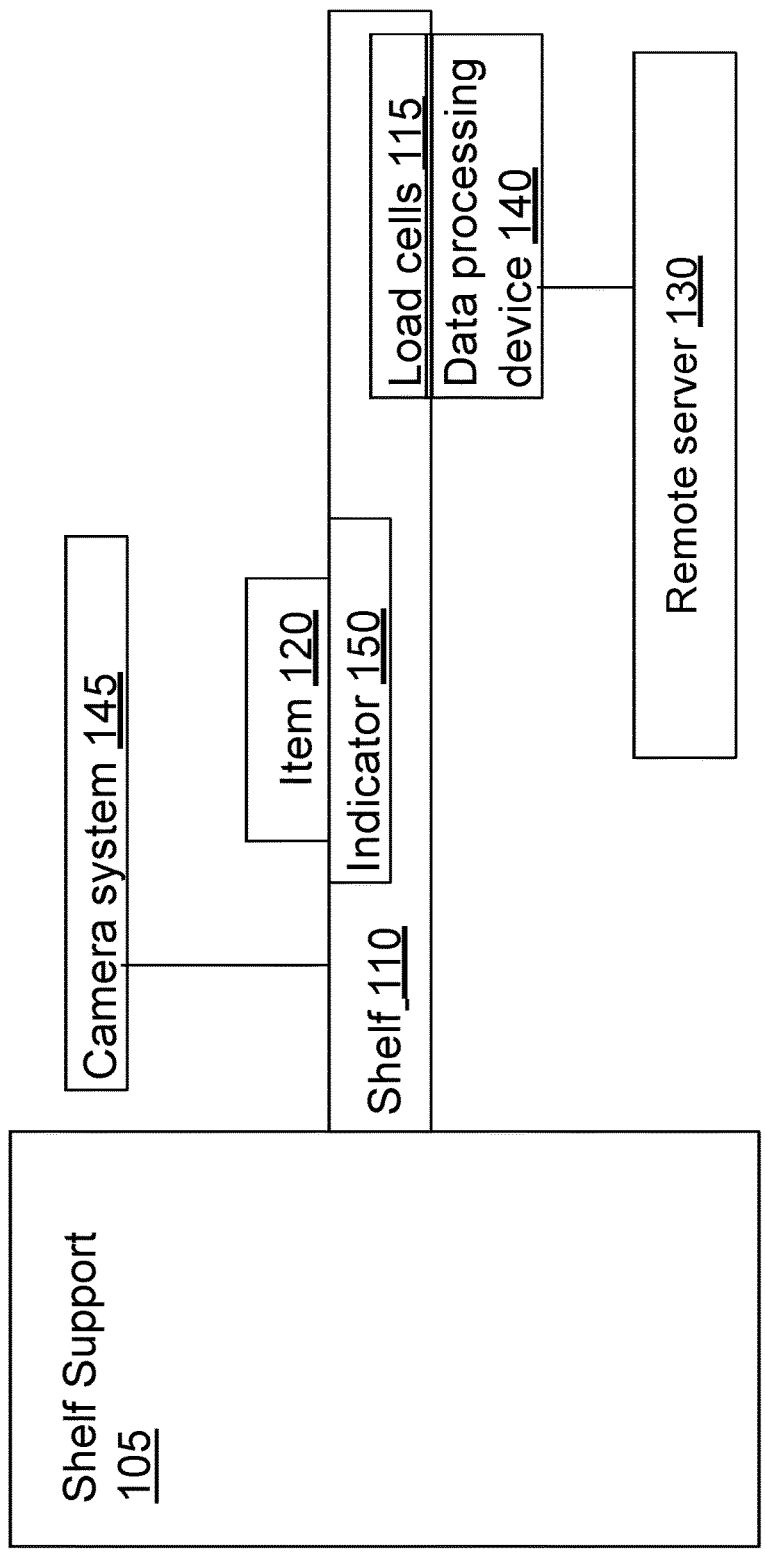
FIG. 1 shows an example diagram of a shelf system for autonomously monitoring items.

FIG. 1 shows an example diagram of a shelf system 100 for autonomously monitoring items.

In some implementations, the system 100 comprises a shelf support 105. In some embodiments, a shelf support can be represented as a board having a regular pattern of holes for inserting shelves, used chiefly for display of items or products. In some embodiments, a shelf support can be any means to attach multiple shelves with items for sale.

In some embodiments, the system comprises a shelf 110. In some embodiments, a shelf can be any shape of solid surface that items or products can be put on. In some embodiments, a shelf is attached physically to the shelf support 105. In some embodiments, multiple shelves are attached to the shelf support 105. In some embodiments, various computer chips, various sensors, different circuitry and other components may attach to the shelf 110.

In some embodiments, the load cells 115 are coupled to the shelf 110. In some embodiments, the load cells comprises different sensors, such as motion detecting sensors, force sensors, load sensors, weight sensors, light sensors and other sensors. In some embodiments, the load cells comprise processors. In some embodiments, the load cells comprise communication units. In some embodiments, the communication units are wireless communication units. In some embodiments, the communications units are wired communication units. In some embodiments, load cells are coupled to the remote server 130 by a device processing device 140 via communication unit or units.

In some embodiments, item 120 is placed on the shelf 110. In some embodiments, In some embodiments, multiple items are placed on the shelf 110.

In some embodiments, there are multiple shelves similar to the shelf 110 are coupled to the shelf support 105.

In some embodiments, the system may also includes the following features: camera system 145 coupled to the remote server, wherein the camera system 145 is configured to have a field of view of the shelf 110, item 120 and other items, wherein the set of camera system 145 is used to track location information of a set of shoppers and item 120 and other items.

In some embodiments, a set of indicators 150 are coupled to the shelf system, wherein each of the set of indicators is placed under each item coupled to the shelf system, wherein the each of the set of indicators is configured to blink when the each item above the each of the set of indicators is removed. In some embodiments, the camera system 145 is configured to view both item 120 and indicator 150.

In some embodiments, the system comprises: A shelf system, comprising: at least one smart shelf 110, wherein a set of load sensors 115 are placed on each corner of the at least one smart shelf, wherein the set of load sensors are configured to measure load data placed at the each corner of the at least one smart shelf; a data processing device 140 coupled to the set of load sensors, wherein the data processing device is configured to calculate weight and change in weight by combining the load data from the each corner of the at least one smart shelf, wherein the data processing device is configured to determine location of an item 120 removed or placed by calculating the location based on changes of load data at the each corner of the at least one smart shelf; a set of cameras 145 coupled to the shelf system, wherein the set of cameras is configured to capture video information of the item on the at least one smart shelf; a set of indicators 150 coupled to the shelf system, wherein each of the set of indicators is placed under each item coupled to the shelf system, wherein the each of the set of indicators is configured to blink when the each item above the each of the set of indicators is removed; and a remote server 130 coupled to the data processing device and the set of cameras via a network, wherein the remote server is configured to use computational resources to process the video information from the set of cameras, wherein the remote server is configured to receive information of the location of the item removed or placed from the data processing device, wherein the remote server is configured to prioritize computational resources to any cameras of the set of cameras with a view of the location of the item removed or placed from the data processing device.

In some embodiments, the network is connected by Ethernet. in some embodiments, the set of load sensors, the set of cameras and the set of cameras are using power over Ethernet.

Figure 2:
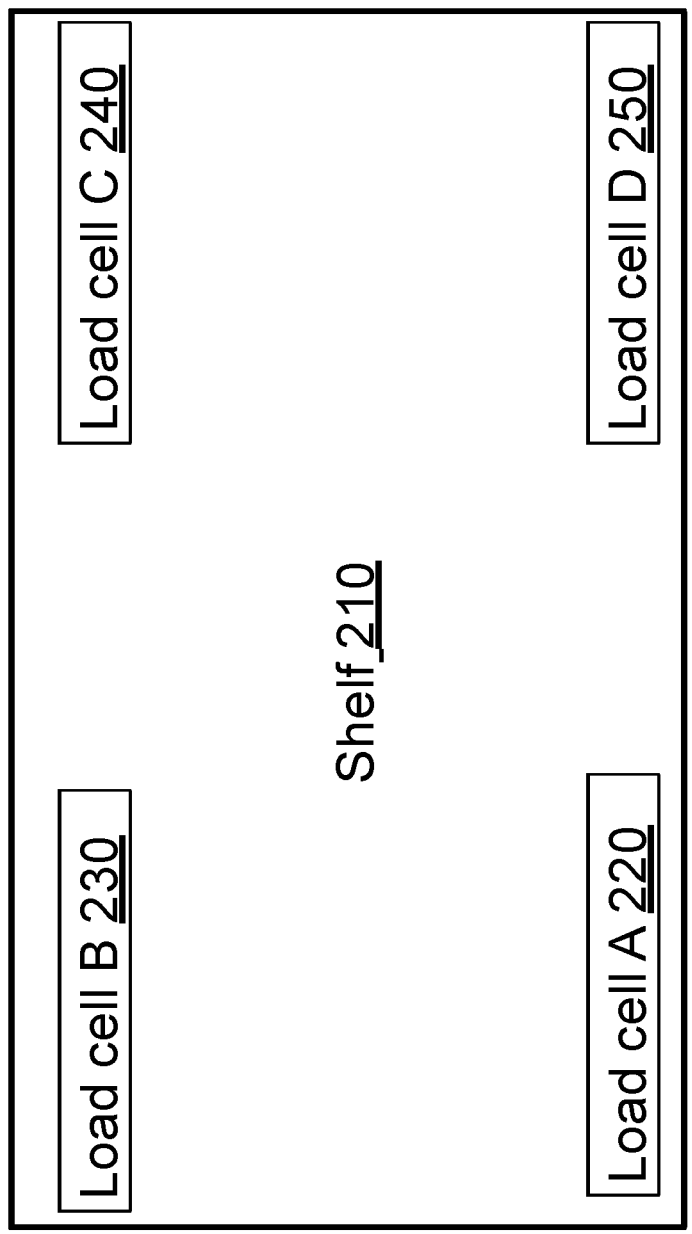
FIG. 2 shows an example diagram of a shelf with load cells.

FIG. 2 shows an example diagram of a shelf with load cells.

In some embodiments, a shelf 210 has load cell A 220 at any of the shelf 210 corner.

In some embodiments, a shelf 210 has load cell A 220 and load cell B 230 at any two of the shelf 210 corner.

In some embodiments, a shelf 210 has load cell A 220, load cell B 230 and load cell C 240 at any three of the shelf 210 corner.

In some embodiments, a shelf 210 has load cell A 220, load cell B 230, load cell C 240, and load cell D 250 at any four of the shelf 210 corner.

In some embodiments, load cells, including load cell A 220, load cell B 230, load cell C 240, and load cell D 250 can detect loads put on the shelf 210 and sense locations of items put on the shelf.

Figure 3:
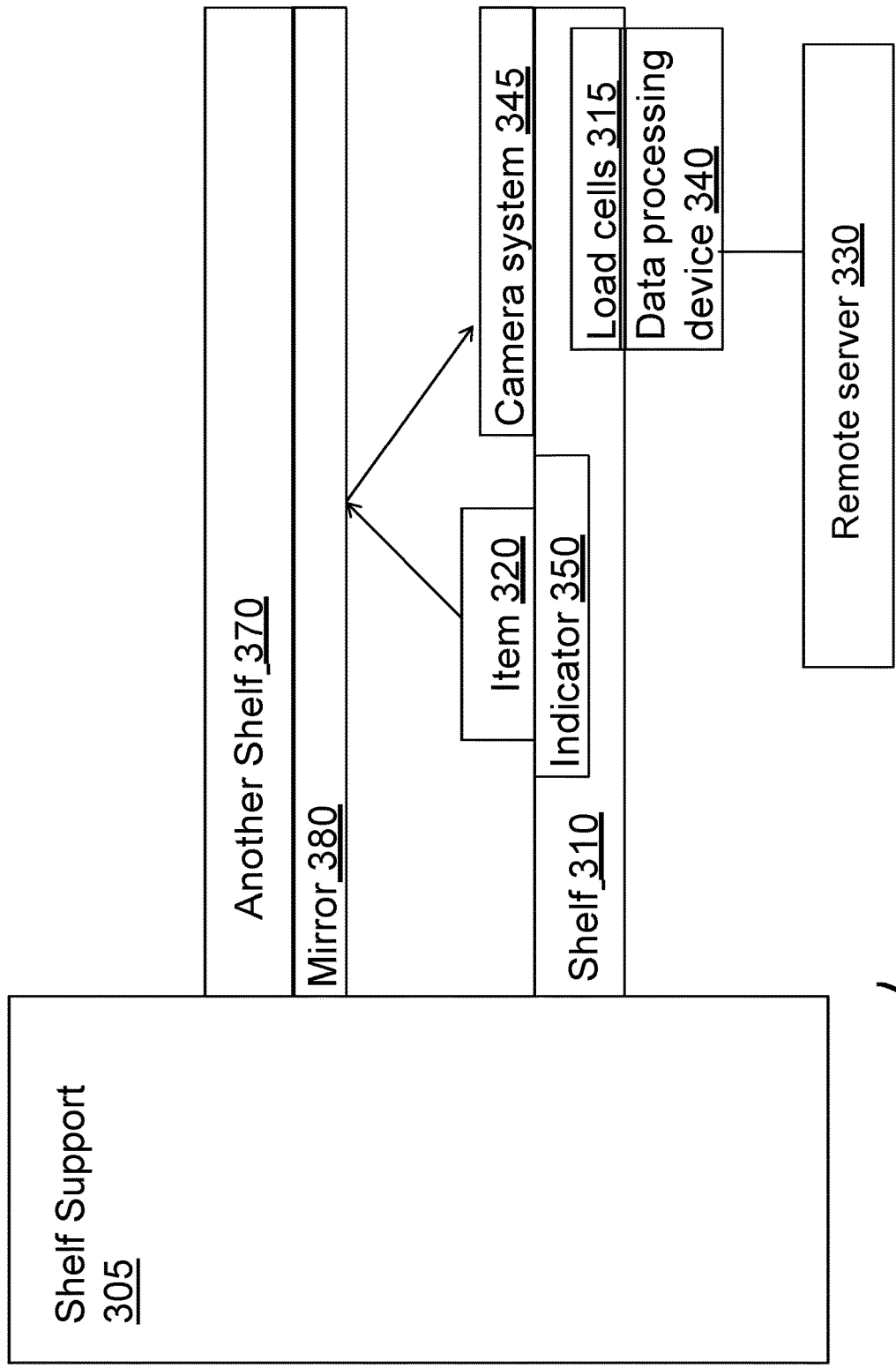
FIG. 3 shows another example diagram of example diagram of a shelf system for autonomously monitoring items.

FIG. 3 shows another example diagram of example diagram of a shelf system for autonomously monitoring items.

In some implementations, in some implementations, the system 300 comprises a shelf support 305. In some embodiments, a shelf support can be represented as a board having a regular pattern of holes for inserting shelves, used chiefly for display of items or products.

In some embodiments, the system comprises a shelf 310. In some embodiments, a shelf can be any shape of solid surface that items or products can be put on. In some embodiments, a shelf is attached physically to the shelf support 305. In some embodiments, multiple shelves are attached to the shelf support 305. In some embodiments, various computer chips, various sensors, different circuitry and other components may attach to the shelf 310.

In some embodiments, the load cells 315 are coupled to the shelf 310. In some embodiments, the load cells comprises different sensors, such as motion detecting sensors, force sensors, load sensors, weight sensors, light sensors and other sensors. In some embodiments, the load cells comprise processors. In some embodiments, the load cells comprise communication units. In some embodiments, the communication units are wireless communication units. In some embodiments, the communications units are wired communication units. In some embodiments, load cells are coupled to the remote server 330 by a device processing device 340 via communication unit or units.

In some embodiments, item 320 is placed on the shelf 310. In some embodiments, multiple items are placed on the shelf 310.

In some embodiments, there are other shelves similar to the shelf 310 are coupled to the shelf support 305.

In some embodiments, a set of indicators 350 are coupled to the shelf system, wherein each of the set of indicators is placed under each item coupled to the shelf system, wherein the each of the set of indicators is configured to blink when the each item above the each of the set of indicators is removed.

In some embodiments, another shelf 370 is placed above shelf 310. Another shelf 370 is also coupled to the shelf support 305. A mirror or mirrors 380 is coupled to the another shelf 370. A camera system 345 coupled to the shelf 310 and has a field of view of item 320 and indicator 350 via the mirror 380. Wider and deeper field of view of the camera system 345 can be achieved by the mirror 380.

In some embodiments, the shelf system 300 comprises: at least one smart shelf 310, wherein a set of load sensors 315 are placed on each corner of the at least one smart shelf, wherein the set of load sensors are configured to measure load data placed at the each corner of the at least one smart shelf a data processing device 340 coupled to the set of load sensors, wherein the data processing device is configured to calculate weight and change in weight by combining the load data from the each corner of the at least one smart shelf, wherein the data processing device is configured to determine location of an item 320 removed or placed by calculating the location based on changes of load data at the each corner of the at least one smart shelf; a set of cameras 345 coupled to the shelf system, wherein the set of cameras is configured to capture video information of the item on the at least one smart shelf, whereas another shelf 370 contains a mirror 380 on the another shelf's bottom, where the at least one smart shelf has a camera of the set of cameras 345 pointing up at the mirror of the another shelf 370, with a field of view of any items on the at least one smart shelf; a remote server 330 coupled to the data processing device and the set of cameras via a network, wherein the remote server is configured to use computational resources to process the video information from the set of cameras, wherein the remote server is configured to receive information of the location of the item removed or placed from the data processing device, wherein the remote server is configured to prioritize computational resources to any cameras of the set of cameras with a view of the location of the item removed or placed from the data processing device, wherein a video image processing algorithm is used to identify the products removed, added or misplaced, wherein changes in weight are used to increase the confidence of identification of the products removed, added or misplaced; and a set of visual indicators 350 coupled to the at least one smart shelf 310, wherein the set of visual indicators 350 are coupled to blink to identify the geo-location of the at least one smart shelf, wherein the set of visual indicators are configured to blink pre-determined patterns to convey digital data to the remote server via the set of cameras, wherein one type of the digital data is unique ID of the at least one smart shelf, wherein the unique ID is related to the physical location of the at least one smart shelf, wherein the set of visual indicators are configured to direct a shopper to a specific item the shopper has purchased before, or an item on the shopper's request, or an item that has a special discount.

In some embodiments, the network is connected by Ethernet. In some embodiments, the set of load sensors, the set of cameras and the set of cameras are using power over Ethernet.

The invention claimed is:

1. A shelf system, comprising:
   at least one smart shelf, wherein a set of load sensors are placed on each corner of the at least one smart shelf, wherein the set of load sensors are configured to measure load data placed at the each corner of the at least one smart shelf;
   a data processing device coupled to the set of load sensors, wherein the data processing device is configured to calculate weight and change in weight by combining the load data from the each corner of the at least one smart shelf, wherein the data processing device is configured to determine location of an item removed or placed by calculating the location based on changes of load data at the each corner of the at least one smart shelf;
   a set of cameras coupled to the shelf system, wherein the set of cameras is configured to capture video information of the item on the at least one smart shelf;

a set of indicators coupled to the shelf system, wherein each of the set of indicators is placed under each item coupled to the shelf system, wherein the each of the set of indicators is configured to blink when the each item above the each of the set of indicators is removed; and
a remote server coupled to the data processing device and the set of cameras via a network, wherein the remote server is configured to use computational resources to process the video information from the set of cameras, wherein the remote server is configured to receive information of the location of the item removed or placed from the data processing device, wherein the remote server is configured to prioritize computational resources to any cameras of the set of cameras with a view of the location of the item removed or placed from the data processing device.

2. The shelf system of claim 1, wherein the network is connected by Ethernet.

3. The shelf system of claim 1, wherein the set of load sensors, the set of cameras and the set of cameras are using power over Ethernet.

4. A shelf system, comprising:
at least one smart shelf, wherein a set of load sensors are placed on each corner of the at least one smart shelf, wherein the set of load sensors are configured to measure load data placed at the each corner of the at least one smart shelf;
a data processing device coupled to the set of load sensors, wherein the data processing device is configured to calculate weight and change in weight by combining the load data from the each corner of the at least one smart shelf, wherein the data processing device is configured to determine location of an item removed or placed by calculating the location based on changes of load data at the each corner of the at least one smart shelf;
a set of cameras coupled to the shelf system, wherein the set of cameras is configured to capture video information of the item on the at least one smart shelf;
a remote server coupled to the data processing device and the set of cameras via a network, wherein the remote server is configured to use computational resources to process the video information from the set of cameras, wherein the remote server is configured to receive information of the location of the item removed or placed from the data processing device, wherein the remote server is configured to prioritize computational resources to any cameras of the set of cameras with a view of the location of the item removed or placed from the data processing device;
a set of visual indicators coupled to the at least one smart shelf, wherein the set of visual indicators are coupled to blink to identify the geo-location of the at least one smart shelf, wherein the set of visual indicators are configured to blink pre-determined patterns to convey digital data to the remote server via the set of cameras, wherein one type of the digital data is unique ID of the at least one smart shelf, wherein the unique ID is related to the physical location of the at least one smart shelf, wherein the set of visual indicators are configured to direct a shopper to a specific item the shopper has purchased before, or an item on the shopper's request, or an item that has a special discount.

5. The shelf system of claim 4, wherein the network is connected by Ethernet.

6. The shelf system of claim 5, wherein the set of load sensors, the set of cameras and the set of cameras are using power over Ethernet.

7. A shelf system, comprising:
at least one smart shelf, wherein a set of load sensors are placed on each corner of the at least one smart shelf, wherein the set of load sensors are configured to measure load data placed at the each corner of the at least one smart shelf;
a data processing device coupled to the set of load sensors, wherein the data processing device is configured to calculate weight and change in weight by combining the load data from the each corner of the at least one smart shelf, wherein the data processing device is configured to determine location of an item removed or placed by calculating the location based on changes of load data at the each corner of the at least one smart shelf;
a set of cameras coupled to the shelf system, wherein the set of cameras is configured to capture video information of the item on the at least one smart shelf, whereas another shelf contains a mirror on the another shelf's bottom, where the at least one smart shelf has a camera of the set of cameras pointing up at the mirror of the another shelf, with a field of view of any items on the at least one smart shelf;
a remote server coupled to the data processing device and the set of cameras via a network, wherein the remote server is configured to use computational resources to process the video information from the set of cameras, wherein the remote server is configured to receive information of the location of the item removed or placed from the data processing device, wherein the remote server is configured to prioritize computational resources to any cameras of the set of cameras with a view of the location of the item removed or placed from the data processing device, wherein a video image processing algorithm is used to identify the products removed, added or misplaced, wherein changes in weight are used to increase the confidence of identification of the products removed, added or misplaced;
a set of visual indicators coupled to the at least one smart shelf, wherein the set of visual indicators are coupled to blink to identify the geo-location of the at least one smart shelf, wherein the set of visual indicators are configured to blink pre-determined patterns to convey digital data to the remote server via the set of cameras, wherein one type of the digital data is unique ID of the at least one smart shelf, wherein the unique ID is related to the physical location of the at least one smart shelf, wherein the set of visual indicators are configured to direct a shopper to a specific item the shopper has purchased before, or an item on the shopper's request, or an item that has a special discount.

8. The shelf system of claim 7, wherein the network is connected by Ethernet.

9. The shelf system of claim 8, wherein the set of load sensors, the set of cameras and the set of cameras are using power over Ethernet.

* * * * *